(12) United States Patent
Muratov et al.

(10) Patent No.: US 10,135,305 B2
(45) Date of Patent: Nov. 20, 2018

(54) MULTI-MODE WIRELESS POWER TRANSMITTER

(71) Applicant: MEDIATEK Singapore Pte. Ltd., Solaris (SG)

(72) Inventors: Vladimir A. Muratov, Manchester, NH (US); Patrick Stanley Riehl, Cambridge, MA (US)

(73) Assignee: MEDIATEK Singapore Pte. Ltd., Solaris (SG)

( * ) Notice: Subject to any disclaimer, the term of this patent is extended or adjusted under 35 U.S.C. 154(b) by 462 days.

(21) Appl. No.: 14/718,366

(22) Filed: May 21, 2015

(65) Prior Publication Data

US 2015/0357827 A1 Dec. 10, 2015

Related U.S. Application Data

(60) Provisional application No. 62/009,981, filed on Jun. 10, 2014.

(51) Int. Cl.
*H01F 27/42* (2006.01)
*H01F 37/00* (2006.01)
(Continued)

(52) U.S. Cl.
CPC ............ *H02J 50/80* (2016.02); *H02J 17/00* (2013.01); *H02J 50/10* (2016.02); *H04B 5/0037* (2013.01); *H04B 5/0087* (2013.01)

(58) Field of Classification Search
CPC .... H02J 5/00; H02J 5/005; H02J 50/10; H02J 17/00; H02J 50/80; H04B 5/0037; H04B 5/0087; H01F 38/14
(Continued)

(56) References Cited

U.S. PATENT DOCUMENTS 6,960,968 B2   11/2005   Odenaal et al.
7,643,312 B2    1/2010   Vanderelli
(Continued)

FOREIGN PATENT DOCUMENTS

CN   101682216 A    3/2010
CN   101860089 A   10/2010
(Continued)

OTHER PUBLICATIONS

International Search Report and Written Opinion dated Jun. 13, 2014 for Application No. PCT/US2014/17505.
(Continued)

*Primary Examiner* — Carlos Amaya
(74) *Attorney, Agent, or Firm* — Wolf, Greenfield & Sacks, P.C.

(57) ABSTRACT

Some embodiments relate to a multi-mode wireless power transmitter. The transmitter includes an inverter configured to produce at its output a first signal having a first frequency or a second signal having a second frequency. The transmitter also includes a first transmit coil coupled to the output of the inverter and configured to wirelessly transmit power at the first frequency. The transmitter also includes a second transmit coil coupled to the output of the inverter and configured to wirelessly transmit power at the second frequency. The transmitter further includes at least one matching network coupled to the first transmit coil, the second transmit coil, and the output of the inverter. The at least one matching network is configured to provide power to the first transmit coil in response to the first signal and inhibit providing power to the second transmit coil in response to the first signal.

21 Claims, 12 Drawing Sheets

(51) Int. Cl.
*H01F 38/00* (2006.01)
*H02J 50/80* (2016.01)
*H02J 17/00* (2006.01)
*H04B 5/00* (2006.01)
*H02J 50/10* (2016.01)

(58) Field of Classification Search
USPC .......................................................... 307/104
See application file for complete search history.

(56) References Cited

U.S. PATENT DOCUMENTS

| | | | |
|---|---|---|---|
| 7,990,103 B2 | 8/2011 | Klinghult | |
| 8,217,535 B2 | 7/2012 | Uchida | |
| 2007/0222542 A1 | 9/2007 | Joannopoulos et al. | |
| 2008/0157603 A1 | 7/2008 | Baarman et al. | |
| 2008/0211320 A1 | 9/2008 | Cook et al. | |
| 2009/0284220 A1* | 11/2009 | Toncich | G06K 7/0008 320/108 |
| 2010/0068998 A1 | 3/2010 | Zyambo et al. | |
| 2010/0190435 A1 | 7/2010 | Cook et al. | |
| 2010/0289449 A1 | 11/2010 | Elo | |
| 2010/0308939 A1 | 12/2010 | Kurs | |
| 2011/0101790 A1 | 5/2011 | Budgett | |
| 2011/0169338 A1 | 7/2011 | Kozakai | |
| 2011/0291491 A1* | 12/2011 | Lemmens | H02J 5/005 307/104 |
| 2011/0304216 A1 | 12/2011 | Bauman | |
| 2012/0146580 A1 | 6/2012 | Kitamura | |
| 2012/0248889 A1 | 10/2012 | Fukushi | |
| 2012/0262004 A1 | 10/2012 | Cook et al. | |
| 2012/0306284 A1* | 12/2012 | Lee | H02J 17/00 307/104 |
| 2013/0043727 A1* | 2/2013 | Liu | G06F 1/26 307/31 |
| 2013/0049484 A1 | 2/2013 | Weissentern et al. | |
| 2013/0062961 A1 | 3/2013 | Park et al. | |
| 2014/0035383 A1 | 2/2014 | Riehl | |
| 2014/0049118 A1* | 2/2014 | Karalis | H01F 38/14 307/104 |
| 2014/0117927 A1 | 5/2014 | Chateau et al. | |
| 2014/0217831 A1* | 8/2014 | Hyoung | H02J 5/005 307/104 |
| 2014/0354223 A1* | 12/2014 | Lee | H02J 5/005 320/108 |
| 2014/0361628 A1* | 12/2014 | Huang | H01F 38/14 307/104 |
| 2014/0375139 A1* | 12/2014 | Tsukamoto | H02J 5/005 307/104 |
| 2015/0049516 A1* | 2/2015 | Yan | H02M 3/33507 363/17 |
| 2015/0061577 A1* | 3/2015 | Ye | H02J 7/025 320/108 |
| 2015/0097438 A1* | 4/2015 | Aioanei | H02J 7/025 307/104 |
| 2015/0115723 A1 | 4/2015 | Levo et al. | |
| 2015/0207333 A1 | 7/2015 | Baarman et al. | |
| 2015/0333530 A1* | 11/2015 | Moyer | H02J 7/025 307/104 |
| 2016/0261148 A1 | 9/2016 | Riehl | |

FOREIGN PATENT DOCUMENTS

| | | |
|---|---|---|
| CN | 102113195 A | 6/2011 |
| CN | 102130513 A | 7/2011 |
| CN | 102150340 A | 8/2011 |
| WO | WO2010025156 A1 | 3/2010 |
| WO | WO2011135571 A2 | 11/2011 |
| WO | WO 2014054227 A1 | 4/2014 |
| WO | PCT/US2015/035009 | 2/2016 |

OTHER PUBLICATIONS

Office Action dated Jan. 20, 2015 for Application No. CN201310334199.7.
International Search Report and Written Opinion dated Feb. 5, 2016 for International Application No. PCT/US2015/035009.
Office Action dated Apr. 13, 2016 for co-pending U.S. Appl. No. 13/956,374.
Office Communication dated Jul. 4, 2016 for Chinese Application No. 201480015266.1.
International Preliminary Report on Patentability for Application No. PCT/US2015/035009 dated Dec. 22, 2016.
Waffenschmidt, Wireless power for mobile devices. 2011 IEEE 33rd International Telecommunications Energy Conference (INTELEC). 2011:1-9.
European Office Communication for Application No. EP 15795235.9 dated Apr. 13, 2017.
Office Communication dated Oct. 6, 2016 for U.S. Appl. No. 14/181,731.
U.S. Appl. No. 15/086,367, filed Mar. 31, 2016, Muratov et al.
U.S. Appl. No. 13/956,374, filed Aug. 1, 2013, Riehl.

* cited by examiner

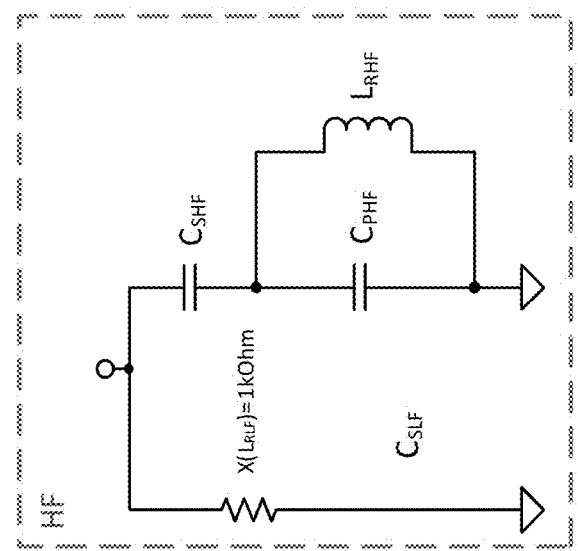
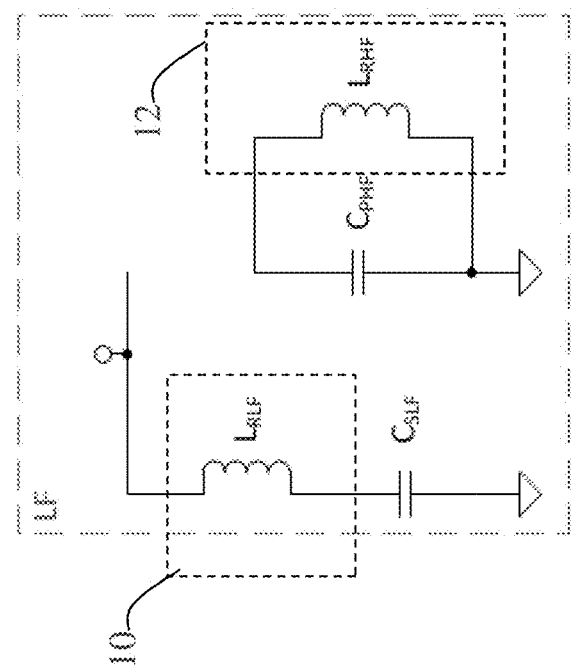
FIG. 3A
FIG. 3B

MULTI-MODE WIRELESS POWER TRANSMITTER

CROSS-REFERENCE TO RELATED APPLICATIONS

This application claims priority to U.S. provisional application Ser. No. 62/009,981, titled "Multi Mode Wireless Power Transfer System," filed Jun. 10, 2014, which is hereby incorporated by reference in its entirety.

BACKGROUND

1. Technical Field

The techniques described herein relate generally to wireless power delivery, and particularly to a wireless power transmitter capable of transmitting wireless power at more than one frequency.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a transmitting unit and a receiving unit. Such systems can be used to power or charge mobile devices such as smartphones, among other applications.

Inductive WPTS typically operate in an allocated frequency range of several hundred kilohertz using frequency variation as a power flow control mechanism. MR WPTS typically operate on a single resonant frequency using input voltage regulation to regulate output power. In typical applications, MR WPTS operate at a frequency of 6.78 MHz.

Several industry committees such as the Wireless Power Consortium (WPC), the Power Matters Alliance (PMA), and the Alliance for Wireless Power (A4WP) are working on developing international standards for consumer products based on wireless power transfer. Currently, due to the difference in operating frequency, WPTS systems of different types are not interoperable. This creates complications and inconveniences to wireless system users and limits proliferation of the technology.

SUMMARY

Some embodiments relate to a wireless power transmitter, comprising: an inverter configured to produce at its output a first signal having a first frequency or a second signal having a second frequency; a first transmit coil coupled to the output of the inverter and configured to wirelessly transmit power at the first frequency; a second transmit coil coupled to the output of the inverter and configured to wirelessly transmit power at the second frequency; and at least one matching network coupled to the first transmit coil, the second transmit coil, and the output of the inverter, the at least one matching network being configured to provide power to the first transmit coil in response to the first signal and inhibit providing power to the second transmit coil in response to the first signal.

Some embodiments relate to a wireless power transmission method, comprising: determining, by a wireless power transmitter, a first frequency for wireless power transmission suitable for wireless power delivery to a first receiver within wireless power transmission range of the wireless power transmitter; the wireless power transmitter driving, by an inverter, a first transmit coil using a first signal having the first frequency; determining, by the wireless power transmitter, a second frequency for wireless power transmission suitable for wireless power delivery to a second receiver within wireless power transmission range of the wireless power transmitter; and the wireless power transmitter driving, by the inverter, a second transmit coil using a second signal having the second frequency.

Some embodiments relate to a wireless power transmitter operable in plurality of modes of operation, the wireless power transmitter comprising: an inverter configured to produce at its output a first wireless power transmission signal having a first frequency when the wireless power transmitter is in a first mode of operation, or a second wireless power transmission signal having a second frequency when the wireless power transmitter is in a second mode of operation, wherein the first wireless power transmission frequency is different from the second wireless power transmission frequency; and a controller coupled to the inverter and configured to control the inverter in the first mode of operation or the second mode of operation.

Some embodiments relate to a wireless power transmission method, comprising: controlling an inverter in a first mode of operation to produce a first wireless power transmission signal having a first frequency; and controlling the inverter in a second mode of operation to produce a second wireless power transmission signal having a second frequency.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 3A shows an equivalent circuit diagram for the matching networks and transmit coils of FIG. 2A when the inverter switches at a relatively low frequency.

FIG. 3B shows an equivalent circuit diagram for the matching networks and transmit coils of FIG. 2A when the inverter switches at a relatively high frequency.

DETAILED DESCRIPTION

The inventors have recognized and appreciated that a multi-mode transmitter capable of transmitting wireless power at different frequencies can facilitate providing power to different types of wireless power receivers designed to operate at different frequencies. Such a multi-mode transmitter can allow providing power to a wider variety of electronic devices. For example, in some embodiments a multi-mode transmitter can be configured to provide power to both MI and MR receivers. In some embodiments, a multi-mode transmitter can provide power to devices that are designed according to a variety of different wireless charging specifications, such as the Qi standard promulgated by WPC, and other specifications designed for wireless power delivery at other frequencies, such as specifications for MR receivers, or other MI specifications. Such a multi-mode transmitter can enable consumers to avoid the need to make a choice between different wireless power specifications, and can reduce or eliminate the need to acquire multiple wireless transmitters to power devices that receive wireless power at different frequencies.

To provide wireless power transmission at different frequencies, multiple wireless transmitters could be integrated into an electronic device. However, such an implementation may lead to increased cost and size due to duplication of components such as inverters and controllers.

Described herein is a multi-mode transmitter that can transmit wireless power at different frequencies having an inverter that is shared by more than one transmit coil. To facilitate transmission to different transmit coils by a shared inverter, in some embodiments the multi-mode transmitter includes matching network(s) that direct the flow of power to the appropriate transmit coil, depending on the transmission frequency. The matching network(s) can be designed with suitable impedances at each transmission frequency to allow power to flow to the appropriate transmit coil while impeding the flow of power to other transmit coil(s) designed to transmit at a different frequency.

Figure 1A:
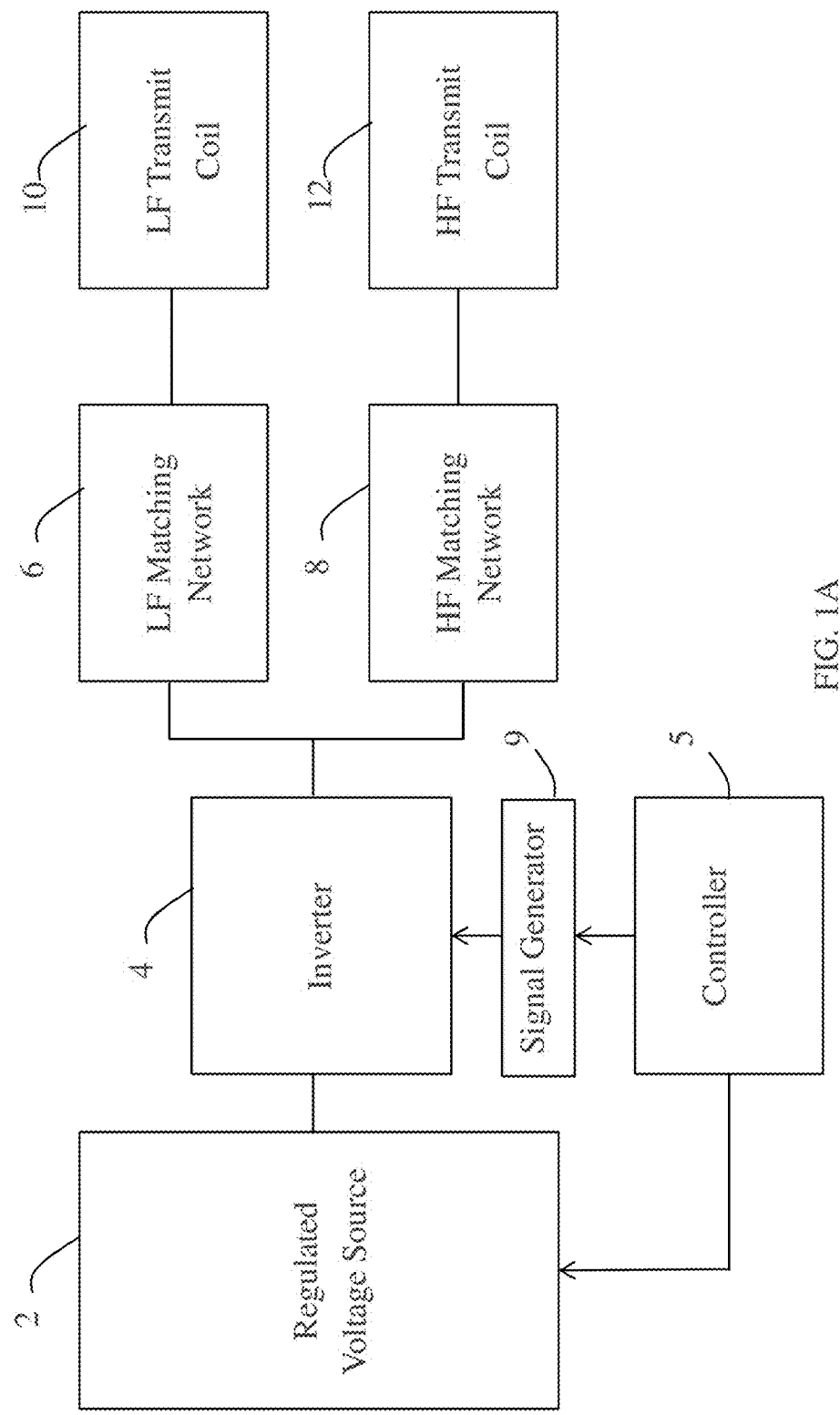
FIG. 1A shows a block diagram of a multi-mode wireless power transmitter, according to some embodiments.

FIG. 1A shows a block diagram of a multi-mode transmitter having a shared inverter, a plurality of matching networks, and a plurality of transmit coils, according to some embodiments. The multimode transmitter may include a regulated voltage source 2 (e.g., a voltage regulator) that provides a regulated DC voltage to an inverter 4. The regulated voltage source 2 produces a regulated DC output voltage provided to the input of the inverter 4 in response to control stimulus from the controller 5. The inverter 4 is a DC-AC converter that converts the DC voltage at the input of inverter 4 into an AC output voltage. Producing an AC output voltage enables wireless power transmission through electromagnetic induction.

The inverter 4 may be any suitable inverter for driving the transmit coils 10 and 12 to deliver wireless power. In some embodiments, the inverter 4 may be a half-bridge inverter that produces an output voltage that alternates as a square wave between the DC voltage at the input and ground voltage. In some embodiments, the inverter 4 may be a full-bridge inverter that produces an output voltage that alternates as a square wave between the DC voltage at the input and a negative polarity version of the input DC voltage. Examples of a half-bridge inverter and a full-bridge inverter are shown in FIGS. 2A, 2B, 4, 6, 7 and 8, and are discussed below. In some embodiments, the inverter 4 may be a class D switching inverter. However, the techniques described herein are not limited in this respect, as any suitable type of inverter may be used. A controller 5 of the multi-mode transmitter may control a signal generator 9 to drive the inverter with signal(s) of a selected frequency, as discussed below. Controller 5 may be an analog controller or a digital controller. Controller 5 may be programmable, and may command a signal generator 9 to produce signals at a desired transmission frequency based on stored program instructions, so that inverter 4 switches at the desired transmission frequency. Signal generator 9 may be an analog circuit or a digital circuit designed to produce signals to drive the inverter 4 at a selected frequency.

The transmit coils 10, 12 may be realized by any suitable type of conductors. The conductors may be wires, including solid wire or Litz wire, or patterned conductors, such as patterned conductors of a PC board or an integrated circuit.

One or more matching networks may be provided for the transmit coils, such as matching networks 6 and 8. The matching network(s) may facilitate wireless power delivery by presenting a suitable impedance to the output of the inverter 4. The matching network(s) may have one or more capacitive or inductive elements or any suitable combination of capacitive and inductive elements. Since the transmit coils may have an inductive impedance, in some embodiments the matching network(s) may include one or more capacitive elements, which, when combined with the impedance(s) of a transmit coil, presents an impedance to the output of the inverter 4 suitable for driving the transmit coil.

As discussed above, a variety of wireless power receivers are being designed which can receive wireless power at different frequencies. In some embodiments, the multi-mode wireless power transmitter may detect the type of receiver that is present in the vicinity of the multi-mode wireless power transmitter, either through communication with the receiver or another technique. For example, the multi-mode wireless power transmitter may detect or otherwise determine the wireless power specification used by the receiver. Such a determination may be made by the controller 5 of the multi-mode transmitter, in some embodiments.

Figure 1B:
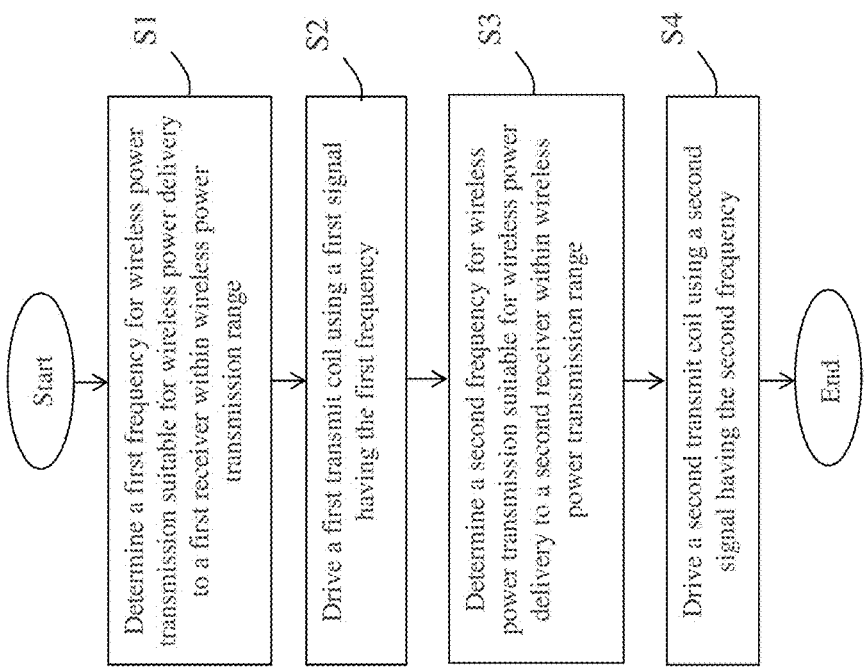
FIG. 1B shows a flowchart of a method of wireless power transmission at different frequencies, according to some embodiments.

FIG. 1B shows a flowchart of a method of wireless power transmission at different frequencies, according to some embodiments. In step S1, a suitable transmit frequency may be selected to wirelessly transmit power to the detected receiver. In step S2, the inverter 4 may drive the transmit coil (e.g., 10 or 12) that is designed to transmit wireless power at the selected transmit frequency, thereby wirelessly transmitting power to the detected receiver. Later, if a different type of receiver is detected in the vicinity of the multi-mode wireless power transmitter that receives power at a different frequency, the multi-mode wireless power transmitter may select another transmission frequency suitable for transmitting power to the newly-detected receiver in step S3 In step S4, the inverter 4 may drive the transmit coil (e.g., 10 or 12) that is designed to transmit wireless power at the new transmit frequency, thereby wirelessly transmitting power to the newly-detected receiver. However, the techniques described herein are not limited as to selecting a wireless power transmission frequency based on the order in which receivers are detected, as the frequency for wireless power transmission may be selected regardless of the order in which receivers are detected.

To transmit power, controller 5 may control inverter 4 to be switched at the selected transmit frequency by controlling signal generator 9 to produce signal(s) at the selected frequency. For example, to transmit power to a receiver designed to receive wireless power according to the Qi specification, the inverter 4 may be switched at a frequency between 110 and 205 kHz for low power Qi receivers and 80-300 kHz for medium power Qi receivers. To transmit power to a receiver designed to receive wireless power using MR technology, the inverter 4 may be switched at a higher frequency, such as a frequency within an ISM band, e.g., 6.765 MHz to 6.795 MHz. However, these frequencies are described merely by way of example, as wireless power may be transmitted at a variety of suitable frequencies, in accordance with any suitable specification.

When inverter 4 is switched at a relatively low frequency (e.g., within the kHz range), the inverter 4 produces a signal that drives the low frequency transmit coil 10 to transmit wireless power. When inverter 4 is switched at a relatively high frequency (e.g., in the MHz range), the inverter 4 produces a signal that drives the high frequency transmit coil 12 to transmit wireless power. According to some embodiments, the power from the inverter 4 can be provided to the appropriate transmit coil by appropriately selecting the impedance and configuration of the matching networks 6, 8 and/or the transmit coils 10, 12, as described below.

Since the matching networks 6 and 8 and transmit coils 10 and 12 may include inductive and/or capacitive elements, their impedance varies as a function of frequency. The inventors have recognized and appreciated that the impedance and/or configuration of the matching networks 6 and 8 and/or transmit coils 10 and 12 can be selected to allow power from the inverter 4 to pass to the appropriate transmit coil, while inhibiting power from passing to a transmit coil designed to transmit at a different frequency. The matching networks 6 and 8 and/or transmit coils 10 and 12 may be designed such that if inverter 4 is controlled to transmit at a low frequency, the power is allowed to pass through matching network 6 to the low frequency transmit coil 10, while matching network 8 presents a high impedance that prevents significant power from passing to the high frequency transmit coil 12. If inverter 4 is controlled to transmit at a high frequency, the power is allowed to pass through matching network 8 to the high frequency transmit coil 12, while matching network 6 and/or the low frequency transmit coil 10 presents a high impedance that prevents significant power from passing to the low frequency transmit coil 10.

The multi-mode transmitter may transmit wireless power to one receiver at a time or more than one receiver. For example, multiple receivers positioned in the vicinity of the multi-mode transmitter may receive power wirelessly at the selected transmission frequency.

Figure 2A:
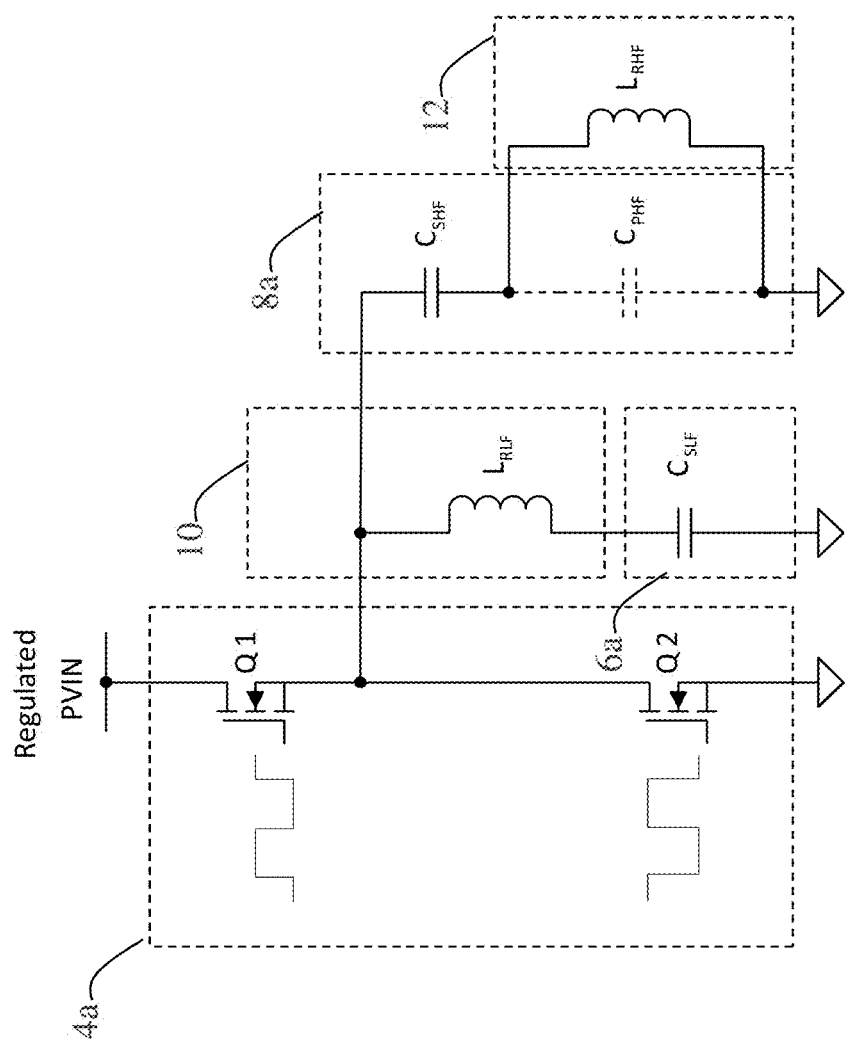
FIG. 2A shows a circuit diagram of a transmission circuit, according to some embodiments.

FIG. 2A shows a circuit diagram of a transmission circuit, according to some embodiments. The transmission circuit includes an inverter 4a, a low frequency matching network 6a, a low frequency transmit coil 10, a high frequency matching network 8a and a high frequency transmit coil 12.

In the example of FIG. 2A, inverter 4a includes two transistors: a high-side transistor Q1 and a low-side transistor Q2. Transistors Q1 and Q2 may be driven by the signal generator 9 in response to control stimulus from the controller 5 with complementary signals having the shape of a square wave, as shown in FIG. 2A, to alternately turn on transistor Q1 and transistor Q2. The controller 5 may provide stimulus to regulated voltage source 2 to adjust DC voltage applied to the inverter 4 to facilitate closed-loop regulation of the power transmitted by the wireless power transmitter depicted in the FIG. 1A. The controller stimulus to regulated voltage source 5 can be provided in analog or digital form. The analog form can be a reference voltage that is proportional to the desired output voltage or power applied to the inverter 4, or as an error voltage that is proportional to the difference between current regulator voltage and the desired regulator voltage. The analog stimulus from the controller can be substituted by its digital equivalent as it is common in the art of digital control systems and power converters.

Inverter 4a may be driven with signals having a suitable transmission frequency, including frequencies suitable for transmitting wireless power according to different wireless power transmission standards. For example, in some embodiments, the transmission circuit may be a multi-mode transmission circuit capable of transmitting wireless power in a relatively low frequency range between 80 kHz and 300 kHz, and at a relatively high frequency of 6.78 MHz. The inventors have recognized and appreciated that these frequencies are spaced far enough apart that suitable transmission selectivity can be provided by designing the matching networks 6 and 8 to allow transmission at the selected frequency while inhibiting transmission in the non-selected frequency. In some embodiments, the impedances from the output of the inverter 4 to the respective transmit coils may be different from one another by a factor of five or more, a factor of twenty-five or more, or a factor of fifty or more.

In the example of FIG. 2A, matching network 6a may be realized by a capacitive element (e.g., a capacitor). Matching network 8 of FIG. 2A may be realized by a plurality of capacitive elements in series, with the high frequency transmit coil 12 being connected in parallel with the bottom capacitive element, as shown in FIG. 2A. However, matching networks 6a and 8a may have any suitable capacitive and/or inductive elements. In some embodiments matching network 8a may be realized by a series capacitor only, as the parallel capacitor is optional (as indicated by the dashed lines in FIG. 2A).

Table 1 shows examples of component values for the components shown in FIG. 2A, as well as the impedances of these components at the relatively low transmission frequency (LF) and the high transmission frequency (HF), respectively. Component values are in units of farads and henries, for capacitance and inductance, respectively. Impedances are in units of ohms. These component and impedance values are provided merely by way of illustration, as any suitable component values may be used.

TABLE 1

| Component | Value | X (LF) | X (HF) |
|---|---|---|---|
| LRLF | 2.40E−05 | 17.3 | 1022.4 |
| LRHF | 2.00E−06 | 1.4 | 85.2 |
| CSLF | 1.00E−07 | 13.8 | 13.8 |
| CSHF | 2.20E−10 | 6290.7 | 6290.7 |
| CPHF | 3.30E−11 | 41938.1 | 41938.1 |

FIG. 3A shows an equivalent circuit diagram for the matching networks and transmit coils of FIG. 2A when the inverter 4 switches at a frequency between 110 kHz and 205 kHz. At such a low frequency, the capacitor $C_{SHF}$ acts an open circuit, thereby preventing the high frequency transmit coil 12 from receiving power from the inverter 4. The signal produced by inverter 4 is provided to the low frequency transmit coil 10, which transmits wireless power.

FIG. 3B shows an equivalent circuit diagram for the matching networks and transmit coils of FIG. 2A when the inverter 4 switches at a frequency of 6.78 MHz. At such a frequency, the inductance of the low frequency transmit coil has a high impedance (e.g., 1 kΩ), which prevents significant power from flowing through it. The signal produced by inverter 4 is provided to the high frequency transmit coil 12, which transmits wireless power. Accordingly, the impedance of the matching network(s), the impedance of the transmit coil(s), or both, may be chosen to provide selectivity between the transmit coils at different frequencies.

Figure 2B:
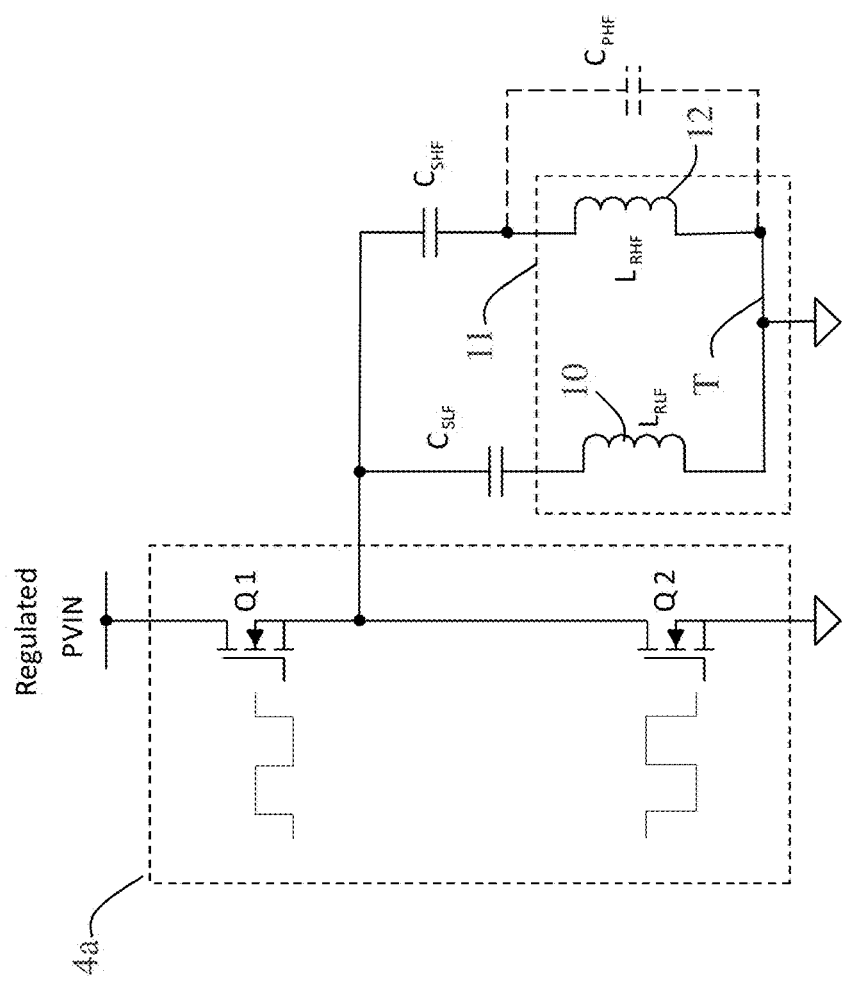
FIG. 2B shows a circuit diagram of a transmission circuit in which transmit coils may be implemented by a three terminal coil assembly.

In some embodiments, the transmit coils may be implemented by a three terminal coil assembly 11, as illustrated in FIG. 2B. The common terminal T between the high frequency transmit coil and the low frequency transmit coil may be connected to a ground terminal of the transmission circuit.

Figure 4:
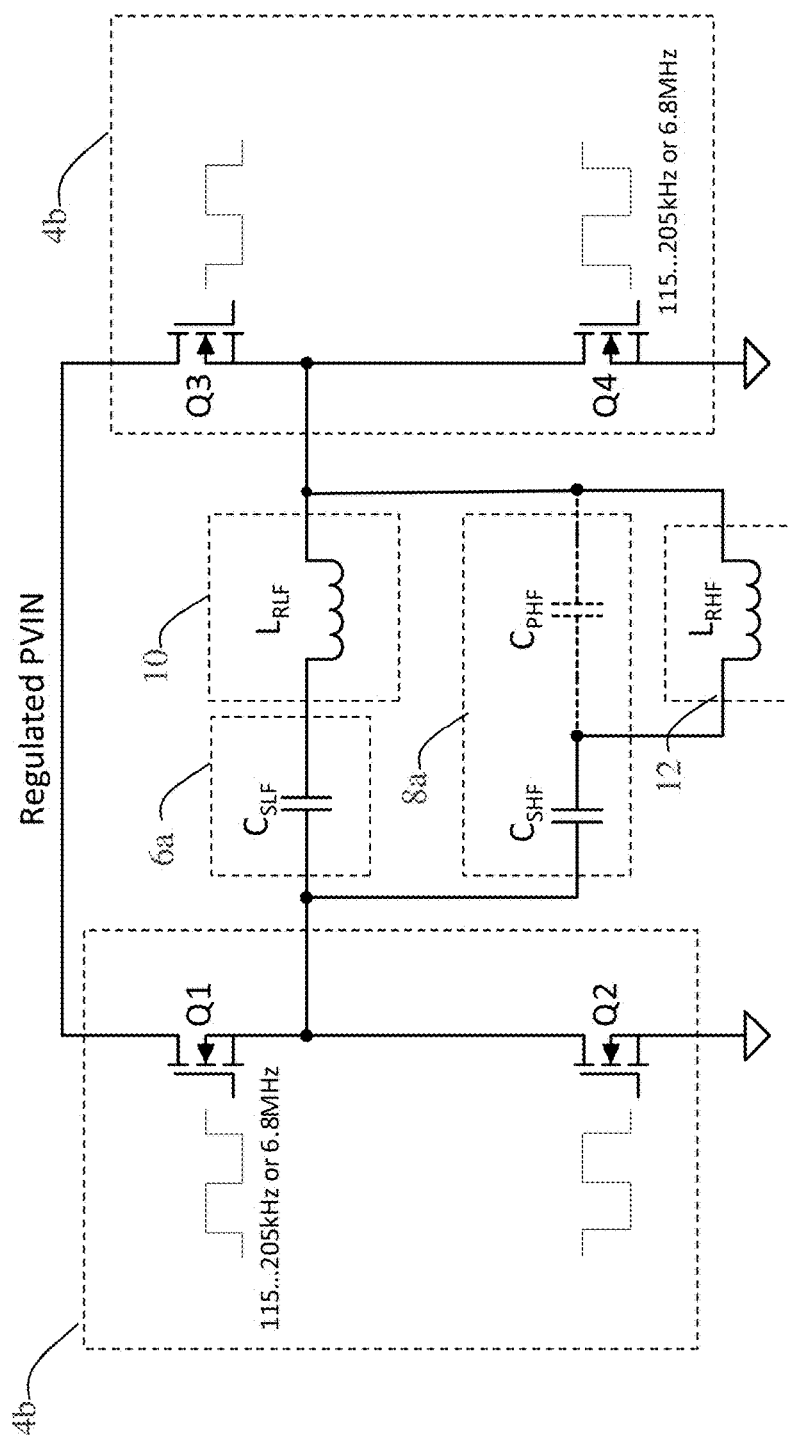
FIG. 4 shows a circuit diagram of a transmission circuit having a full bridge configuration, according to some embodiments.

FIG. 4 shows a circuit diagram of a transmission circuit having a full bridge inverter 4b, according to some embodiments. The full bridge inverter 4b includes transistors Q1-Q4 connected in a full bridge configuration, to enable providing both positive and negative voltages across the matching network(s) and/or transmit coil(s). In a first phase of operation, transistors Q1 and Q4 may be turned on and transistors Q2 and Q3 may be turned off, thereby providing a positive voltage across the matching network(s) and/or transmit coil(s). In a second phase of operation, transistors Q1 and Q4 may be turned off and transistors Q2 and Q3 may be turned on, thereby providing a negative voltage across the matching network(s) and/or transmit coil(s). In the example of FIG. 4, the matching networks and transmit coils are shown to have the same components as illustrated in FIG. 2A, connected in a full bridge configuration rather than a half bridge configuration. However, other suitable configurations and types of components may be used, as the techniques described herein are not limited to specific component configurations or types.

Figure 5:
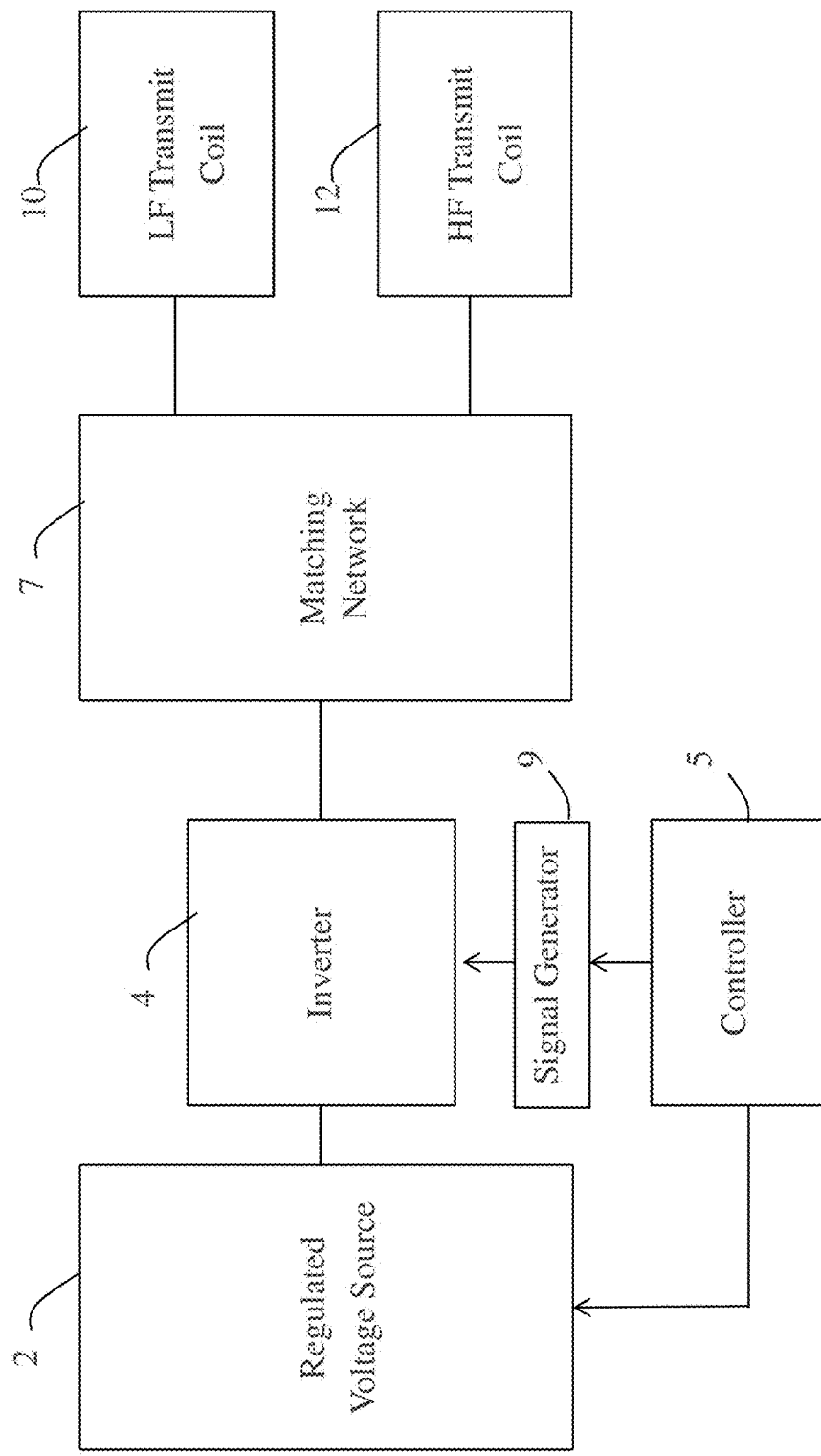
FIG. 5 shows a block diagram of a multi-mode wireless power transmitter having a shared matching network.

FIG. 5 shows a block diagram of a multi-mode transmitter having a shared matching network 7 for transmit coils 10 and 12, according to some embodiments. FIG. 5 illustrates that the matching network(s) for transmit coils 10 and 12 need not be implemented as separate matching networks. The matching network(s) may be completely shared by the transmit coils, partially shared by the transmit coils, or separate matching networks may be provided for different transmit coils.

Figure 6:
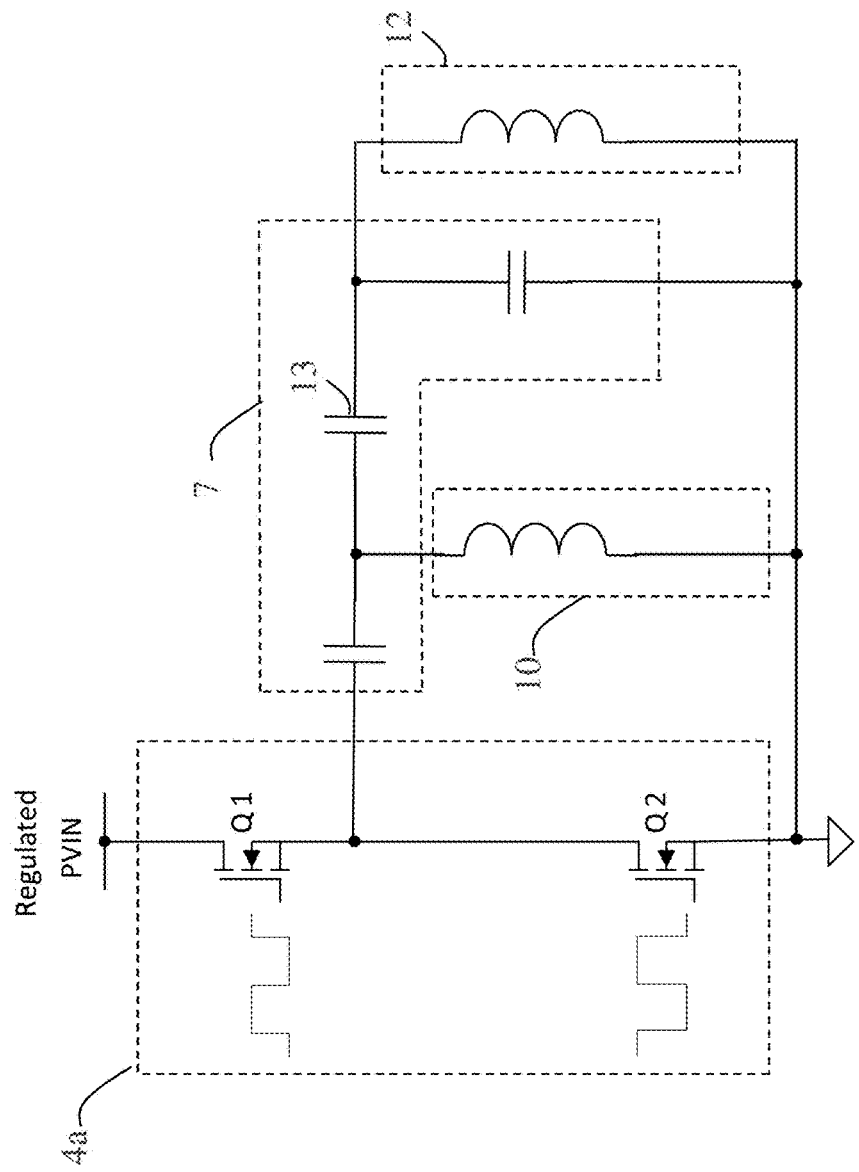
FIG. 6 shows a transmission circuit having a matching network that is at least partially shared by the transmit coils.

FIG. 6 shows a transmission circuit having a matching network that is at least partially shared by the transmit coils 10 and 12. Matching network 7 allows power from a high frequency signal to pass to the high frequency transmit coil 12, and prevents substantial power from a low frequency signal from passing to the high frequency transmit coil 12. The capacitive element 13 may have a capacitance value selected to present a high impedance for low transmit frequencies, thus preventing power from low frequency signals from passing to the high frequency transmit coil 12. The inductive impedance of low frequency transmit coil 10 prevents substantial power from high frequency signals from passing to the low frequency transmit coil 10. The matching network 7 allows power from low frequency signals to pass through to low frequency transmit coil 10.

Figure 7:
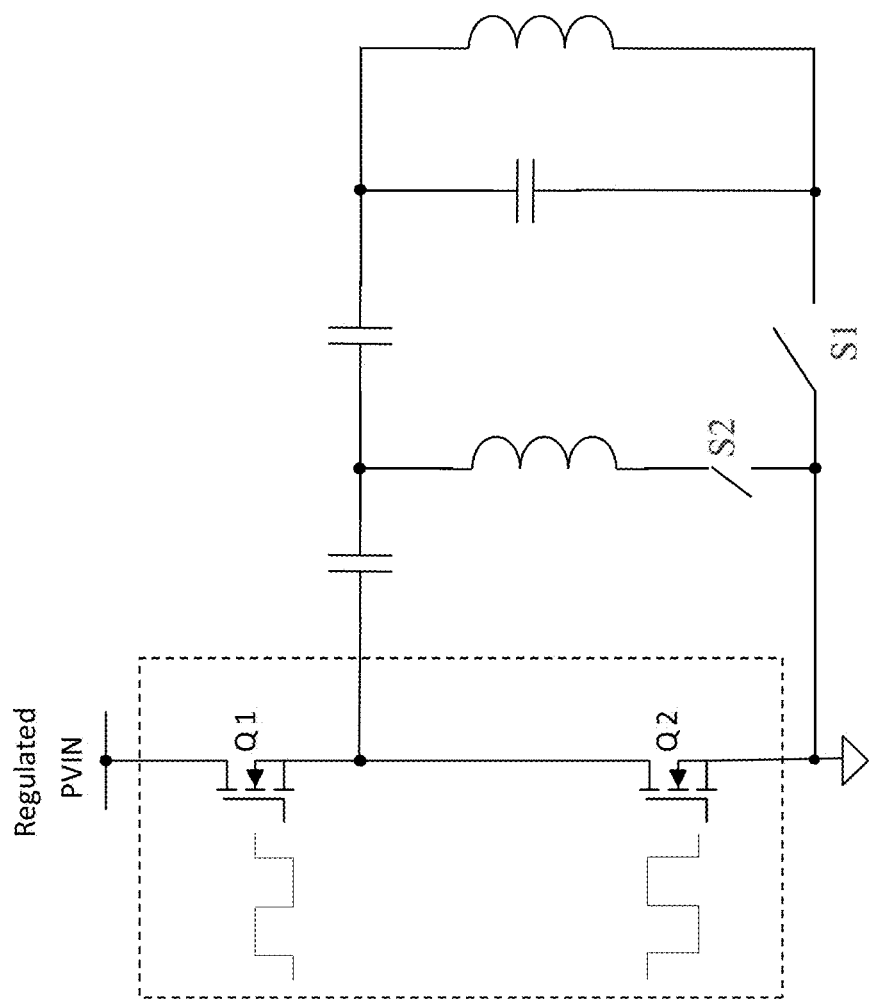
FIG. 7 shows a diagram of a transmission circuit as in FIG. 6, with the addition of a switch between the high frequency and low frequency transmit coils.

FIG. 7 shows a diagram of a transmission circuit as in FIG. 6, with the addition of optional switches S1 and S2, either or both of which may be included in the transmission circuit of FIG. 6. In some embodiments, the switch S1 may be turned off (non-conductive) when low frequency signals are being generated, to introduce a high impedance that prevents substantial power from passing to the high frequency transmit coil 12. Turning off the switch S1 can prevent or reduce ringing in the high frequency transmit coil 12, which can reduce electromagnetic interference. Switch S1 may be turned on (conductive) when high frequency signals are being generated. The switch S2 may be turned off (non-conductive) when high frequency signals are being generated, to introduce a high impedance that prevents power from passing to the low frequency transmit coil 10. Switch S2 may be turned on (conductive) when low frequency signals are being generated. Switches S1 and/or S2 may be controlled by controller 5.

Although switches S1 and S2 are illustrated in the context of the circuits of FIGS. 6 and 7, the techniques described herein are not limited in this respect, as such switches may be used with other types and configurations of matching circuits. Such a switch or switches may be connected in the power path for a transmit coil or the power paths for plurality of transmit coils, and can allow introducing a high impedance into such power path(s) when a power path is not intended to be used.

Figure 8:
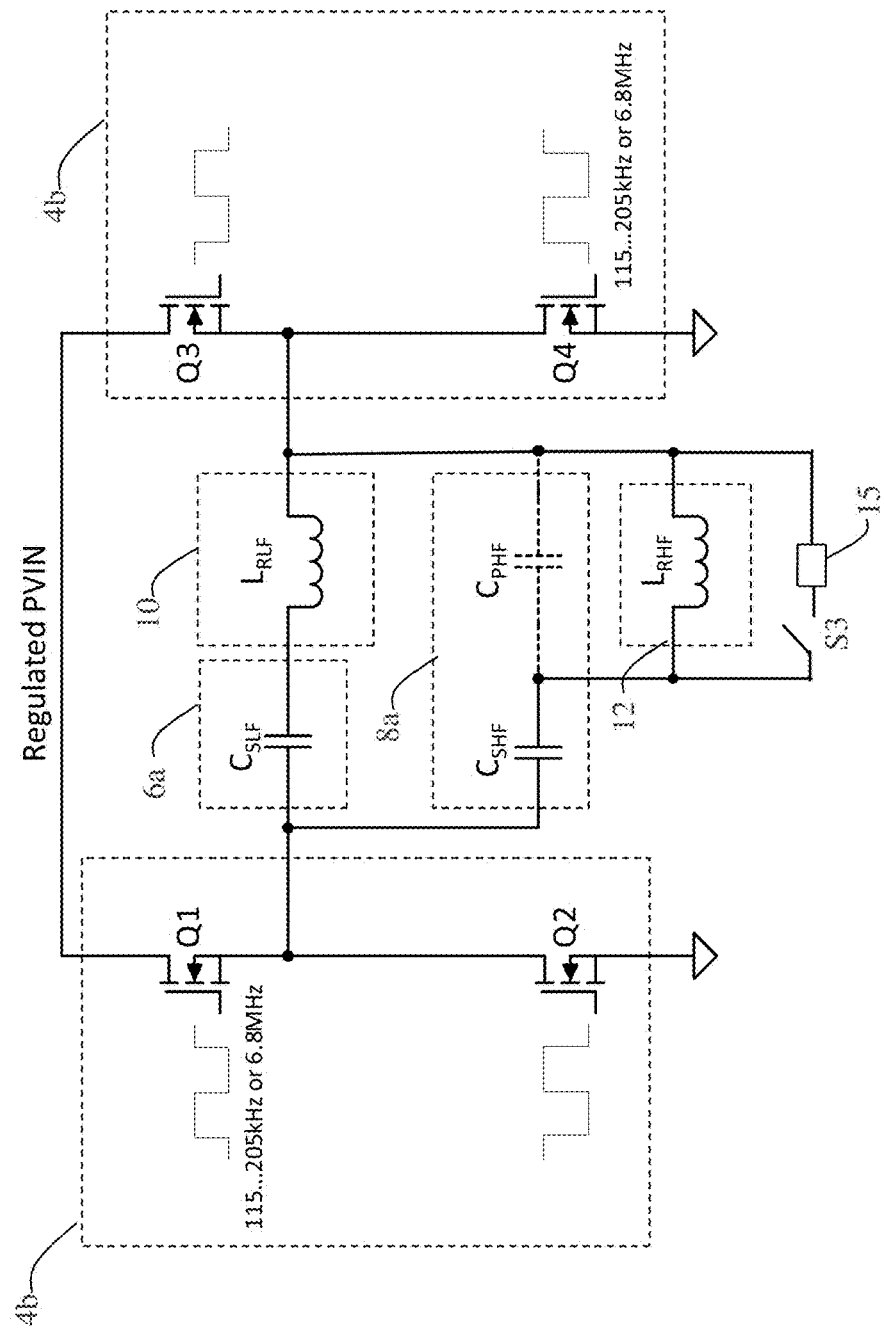
FIG. 8 shows a diagram of a transmission circuit as in FIG. 4, with the addition of a switchable resistor in parallel with the high frequency transmit coil.

FIG. 8 shows a diagram of a transmission circuit as in FIG. 4, with the addition of a resistor 15 and a switch S3. Resistor 15 may be switched in parallel with the high frequency transmit coil 12 by turning on switch S3 (e.g., conductive) when low frequency signals are being generated, to prevent or reduce ringing in the high frequency transmit coil 12. The switch S3 may be controlled by controller 5.

Examples of transmission circuits that can transmit wireless power using two different transmit coils have been described above. However, the techniques described herein are not limited to transmitting wireless power using two different transmit coils. In some embodiments, three or more transmit coils may be provided to transmit wireless power in three or more different frequency bands.

Figure 9:
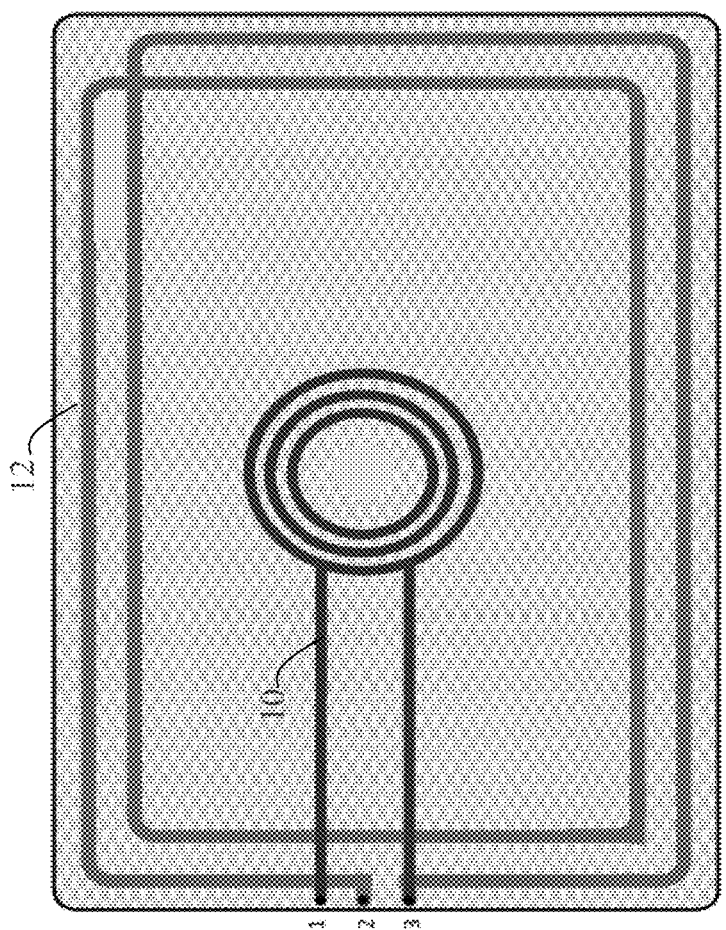
FIG. 9 shows a configuration in which the low frequency transmit coil is disposed within the bounds of the high frequency transmit coil.
Figure 10:
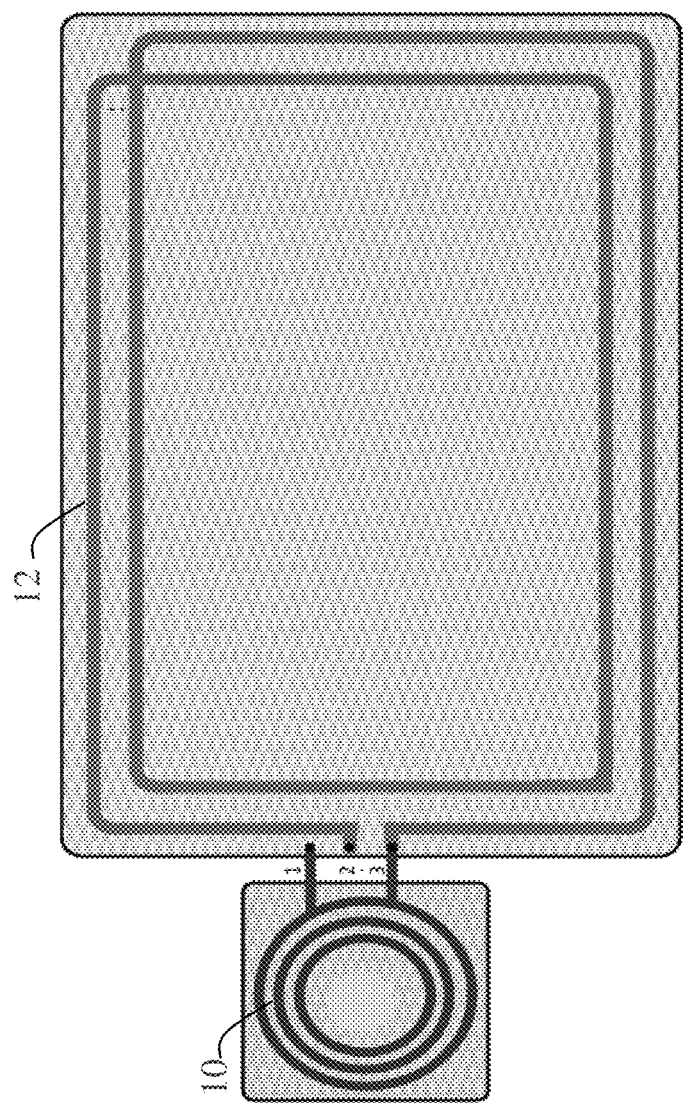
FIG. 10 shows a configuration in which the low frequency transmit coil is disposed outside the bounds of the high frequency transmit coil.

The transmit coils may be arranged in any suitable configuration. FIG. 9 shows a configuration in which the low frequency transmit coil is placed within the bounds of the high frequency coil. Such a configuration may facilitate fabrication of the transmit coils, but may result in increased coupling between the transmit coils. FIG. 10 shows a configuration in which the low frequency transmit coil is placed outside the bounds of the high frequency coil, adjacent to the high frequency transmit coil. Such a configuration may decrease coupling between the coils.

A multi-mode transmitter may be controlled using controller 5, which may be implemented by any suitable type of circuitry. For example, the controller 5 may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. For example, an apparatus, structure, device, layer, or region recited as "including," "comprising," or "having," "containing," "involving," a particular material is meant to encompass at least the material listed and any other elements or materials that may be present.

What is claimed is:

1. A wireless power transmitter, comprising:
   an inverter configured to produce at its output a first signal having a first frequency or a second signal having a second frequency;
   a first transmit coil coupled to the output of the inverter and configured to wirelessly transmit power at the first frequency;
   a second transmit coil coupled to the output of the inverter and configured to wirelessly transmit power at the second frequency; and
   at least one matching network coupled to the first transmit coil, the second transmit coil, and the output of the inverter, the at least one matching network being configured to provide power to the first transmit coil in response to the first signal and inhibit providing power to the second transmit coil in response to the first signal; and
   a controller configured to detect a type of wireless power receiver in a vicinity of the wireless power transmitter and control the inverter to produce the first signal of the first frequency or the second signal of the second frequency based on the type of wireless power receiver detected,
   wherein an inductance of the first transmit coil is larger than an inductance of the second transmit coil.

2. The wireless power transmitter of claim 1, wherein the second frequency is higher than the first frequency.

3. The wireless power transmitter of claim 2, wherein the first frequency is lower than 300 kHz and the second frequency is higher than 1 MHz.

4. The wireless power transmitter of claim 3, wherein the second frequency is between 6.765 MHz and 6.795 MHz.

5. The wireless power transmitter of claim 1, having a first impedance between the output of the inverter and the first transmit coil, and a second impedance between the output of the inverter and the second transmit coil, wherein the first impedance is at least five times lower than the second impedance at the first frequency.

6. The wireless power transmitter of claim 5, wherein the first impedance is at least twenty-five times lower than the second impedance at the first frequency.

7. The wireless power transmitter of claim 1, wherein the wireless power transmitter is configured to provide power to the second transmit coil in response to the second signal and inhibit providing power to the first transmit coil in response to the second signal.

8. The wireless power transmitter of claim 7, wherein the first transmit coil has an inductance that inhibits providing power to the first transmit coil in response to the second signal.

9. The wireless power transmitter of claim 1, wherein the at least one matching network comprises a capacitive element that inhibits providing power to the second transmit coil in response to the first signal.

10. The wireless power transmitter of claim 1, wherein the inverter has a full-bridge configuration or a half-bridge configuration.

11. The wireless power transmitter of claim 1, further comprising at least one switch configured to inhibit power from being delivered to the first transmit coil or the second transmit coil.

12. The wireless power transmitter of claim 1, further comprising a resistor configured to be switched into parallel with the second transmit coil.

13. The wireless power transmitter of claim 1, wherein the at least one matching network comprises a first matching network coupled to the first transmit coil and a second matching network coupled to the second transmit coil.

14. The wireless power transmitter of claim 13, wherein the first matching network comprises a capacitive element in series with the first transmit coil.

15. The wireless power transmitter of claim 13, wherein the second matching network comprises a capacitive element in series with the second transmit coil.

16. The wireless power transmitter of claim 1, wherein the first transmit coil is disposed within a boundary of the second transmit coil or outside a boundary of the second transmit coil.

17. The wireless power transmitter of claim 1, further comprising a three terminal coil assembly that includes the first transmit coil and the second transmit coil.

18. The wireless power transmitter of claim 17, wherein the three terminal coil assembly has a common terminal between the first and second transmit coils, the common terminal being connected to a ground terminal of the wireless power transmitter.

19. A wireless power transmission method, comprising:
   detecting, by a wireless power transmitter, a type of wireless power receiver present in a vicinity of the wireless power transmitter;
   determining, by the wireless power transmitter, a first frequency for wireless power transmission based on the type of wireless power receiver detected;
   the wireless power transmitter driving, by an inverter, a first transmit coil having a first inductance using a first signal having the first frequency;
   determining, by the wireless power transmitter, a second frequency for wireless power transmission suitable for wireless power delivery to a second receiver within wireless power transmission range of the wireless power transmitter; and
   the wireless power transmitter driving, by the inverter, a second transmit coil having a second inductance smaller than the first inductance using a second signal having the second frequency.

20. A wireless power transmitter operable in plurality of modes of operation, the wireless power transmitter comprising:

an inverter configured to produce at its output a first wireless power transmission signal having a first frequency when the wireless power transmitter is in a first mode of operation, or a second wireless power transmission signal having a second frequency when the wireless power transmitter is in the second mode of operation, wherein the first wireless power transmission frequency is different from the second wireless power transmission frequency;

a matching network having at least one capacitor sized and connected to direct the first wireless power transmission signal to a first transmit coil and to direct the second wireless power transmission signal to a second transmit coil; and a controller coupled to the inverter and configured to control the inverter in the first mode of operation or the second mode of operation, wherein the controller is configured to detect a type of wireless power receiver in a vicinity of the wireless power transmitter and to determine a mode of operation of the wireless power transmitter based on the type of wireless power receiver detected, the mode of operation being the first mode of operation or the second mode of operation.

21. A wireless power transmission method, comprising:

detecting, by a wireless power transmitter, a type of wireless power receiver present in a vicinity of the wireless power transmitter;

determining a mode of operation of the wireless power transmitter based on the type of wireless power receiver detected, the mode of operation being a first mode of operation or a second mode of operation;

responsive to detecting a first type of wireless power receiver, controlling an inverter in the first mode of operation to produce a first wireless power transmission signal having a first frequency;

providing the first wireless power transmission signal to a matching network that has a capacitance such that the first wireless power transmission signal is delivered to a first transmit coil;

responsive to detecting a second type of wireless power receiver, controlling the inverter in the second mode of operation to produce a second wireless power transmission signal having a second frequency; and providing the second wireless power transmission signal to the matching network, wherein the capacitance of the matching network directs the second wireless power transmission signal to a second transmit coil.

* * * * *